L. F. WESCHE.
AUTOMOBILE THEFT PREVENTING DEVICE.
APPLICATION FILED AUG. 24, 1921.
1,428,307.
Patented Sept. 5, 1922.
2 SHEETS—SHEET 2.
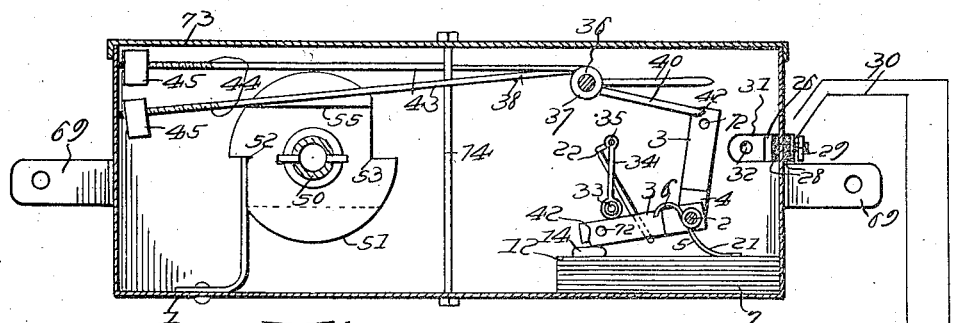
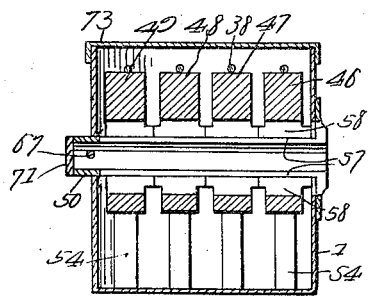
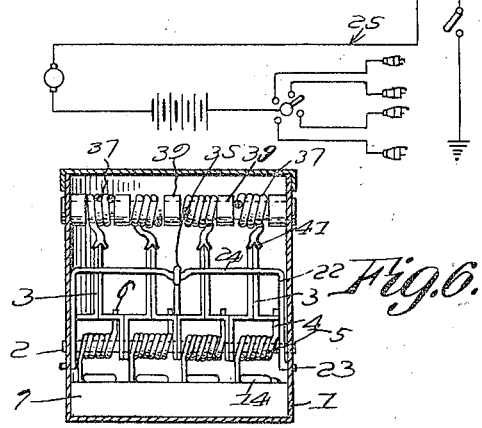
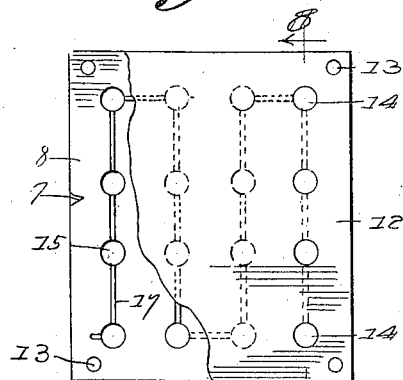
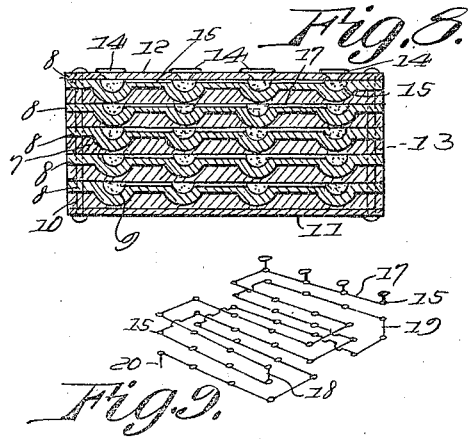
Inventor
Louis F. Wesche,
By Watson E. Coleman
Attorney Patented Sept. 5, 1922.

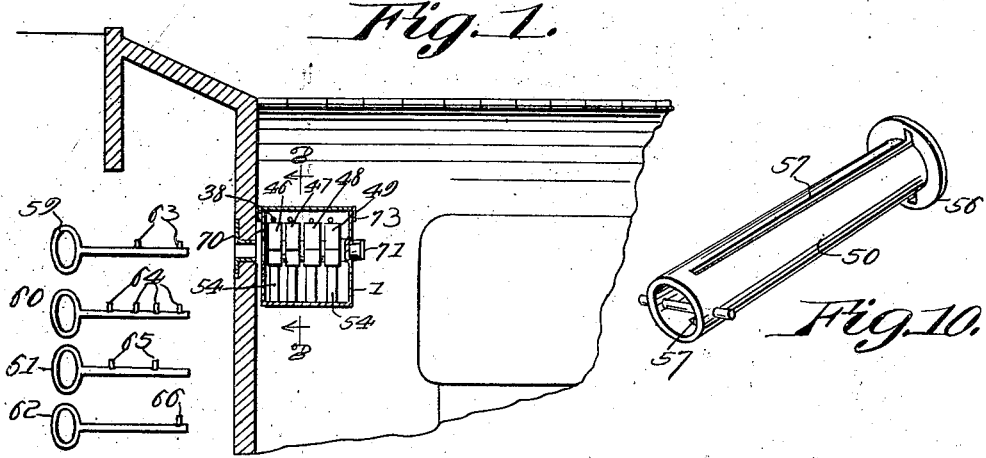

1,428,307

UNITED STATES PATENT OFFICE.

LOUIS F. WESCHE, OF WEBB, IOWA.

AUTOMOBILE THEFT-PREVENTING DEVICE.

Application filed August 24, 1921. Serial No. 495,055.

*To all whom it may concern:*

Be it known that I, LOUIS F. WESCHE, a citizen of the United States, residing at Webb, in the county of Clay and State of Iowa, have invented certain new and useful Improvements in Automobile Theft-Preventing Devices, of which the following is a specification, reference being had to the accompanying drawings.

It has come to pass that so called locks used on automobiles, either for locking the steering wheel or the control lever, or otherwise locking parts of the car are useless, as those who are making a practice of taking automobiles, are now using large trucks, on which they load the automobile, and if they are caught, they readily say, that they had received a phone message to get the car with a certain number and bring it in for repairs, and then would say they had gotten the wrong number, or misunderstood the number.

The present invention has for its purpose the provision of a device for preventing this practice, as well as preventing the thief who gets in the car and attempts to ride away, from stealing the automobile.

To carry this purpose out, it is the aim to provide a theft preventing device wired in circuit with the sparking circuit of the engine, and including a plurality of bombs and actuating devices therefor, so that when one or more of the devices are actuated to fire the bombs, a switch is thrown to break the circuit and stop the automobile, and at the same time a series of bombs are fired consecutively, there being the aim to provide an interval of two or three minutes between the firing of the bombs.

Another purpose is the provision of a device of this kind, whereby should the automobile be stolen, the vibrations of the automobile will cause the release of one or more of a series of triggers, which will in turn release hammers, adapted to strike one or more of a series of caps, which in turn will explode the series of small bombs, which will of course attract the attention of the police, and as a result an easy arrest of the thief will follow.

Still another purpose is the provision of means for setting the vibrating triggers, to hold them against vibration, and including a plurality of keys, so that no one but the owner can set the triggers unless they know the key which has been used. By providing a plurality of keys for setting the vibrating triggers, using first one and then another, a locking or setting device cannot be worked or operated by an unauthorized person, without knowing the key which has been used.

A further purpose consists in the provision of means for regulating the force of the vibration of the triggers, so that the vibrations will sooner or later release the hammers.

While the design and construction at present illustrated and set forth are deemed preferable, it is obvious that as a result of a reduction of the invention to a more practical form for commercial purposes, the invention may be susceptible of changes, and the right to these changes is claimed, provided they are comprehended within the scope of what is claimed.

The invention comprises further features and combination of parts, as will be hereinafter set forth, shown in the drawings and claimed.

In the drawings: —

Figure 1 is a sectional view through a portion of a conventional form of automobile, showing the dash, a portion of the engine and the hood, illustrating the theft preventing device as applied, and also showing a series of keys to be used for setting the vibrating triggers;

Figure 2 is a sectional view on line 2—2 of Figure 1;

Figure 3 is a sectional view on line 3—3 of Figure 2;

Figure 4 is a view similar to Figure 2 showing one of the hammers having been released, and also showing the diagram of the circuit of the sparking mechanism of the automobile;

Figure 5 is a sectional view on line 5—5 of Figure 2;

Figure 6 is a sectional view on line 6—6 of Figure 2;

Figure 7 is a plan view of the holder for a plurality of bombs;

Figure 8 is a sectional view on line 8—8 of Figure 7;

Figure 9 is a diagrammatic view of the arrangement of the various bombs as are arranged between the members of the support;

Figure 10 is a detail perspective view of the sleeve 50; and

Figure 11 is a detail view in section of one side of the casing 1, showing the depressions 68 for the reception of the ends of the pin 67.

Referring to the drawings, 1 designates a casing of the automobile theft preventing device, which may be mounted in any suitable location on the automobile, either under the seat, so that the setting keys may be inserted through the front wall of the seat, or on the dash under the hood, preferably the latter, as shown clearly in Figure 1.

Journaled in the casing is a shaft 2 on which a plurality of cap firing hammers 3 is mounted. These hammers have U-shaped portions 4, through the arms of which the shaft 2 extends, there being a plurality of springs 5 mounted upon the shaft 2, with certain of their ends 6 engaging the transverse portions of the U-shaped ends of the hammers.

Mounted and secured in the casing 1 is an alarm device 7, which is made up of a plurality of bomb carrying plates 8, in depressions 9 of which suitable bombing material, such as fulminate is deposited. These plates are separated by means of the spacing pieces 10, which are formed from any suitable fibrous material, such as pasteboard, or paper pulp or the like. These pieces of plates 10 cover the depressions or cups of the plates 8, thereby acting to hold the dry fulminate or other bombing material in place. The bottom of the alarm device has a holding plate 11, which holds the lower fibrous piece or spacing member in position. Mounted on the top of the alarm device is also a holding plate 12, and passing through the four corners of the alarm device, which has a plurality of bombs, say for instance eighty, more or less in number, are rods 13, the ends of which are headed, so as to hold the parts together. The upper holding plate 12 has a plurality of percussion caps 14, which are arranged adjacent and form the first top row of the bombs 15. The percussion caps 14 are arranged so as to be engaged by the portions 16 of the hammers 3, when released, thus upon firing any one or any two or more of the caps, the first top row of bombs will be fired. If only one percussion cap is fired, the bomb immediately under the same is fired, and since the several bombs throughout the alarm device are connected by fuses 17, the bombs of the uppermost plate 8 are fired. The fuses between the bombs are of such character that there would be an interval of at least two to three seconds more or less between the firing of the bombs. Upon referring to Figure 9 it will be seen that the bombs of the several plates 8 are interconnected, so that when the bombs of the uppermost plate 8 are fired or exploded, the bombs of the succeeding plates below are consecutively fired. For instance as shown in Figure 9 the bombs of the uppermost plate 8 are connected to the bombs of the plate 8 immediately below, by means of the fuse 18. The bombs of the second plate below are connected to the third plate below by means of the fuse 19, and the bombs of the third plate below are connected to the adjacent plate thereunder by means of the fuse 20. The bombs of the several plates are interconnected in this manner, so that the bombs of the several plates will fire consecutively. The number of bombs is governed by the number of plates to be used in the alarm device. In the present instance there are sixteen bombs carried by each plate, and since there are five plates superimposed and spaced, it will be noted that the alarm device comprises eighty bombs, although any number of bombs may be employed.

The coil springs 5, as previously stated are mounted upon the shaft 2, and have their ends 21 resting upon the upper plate 12 of the bombing or alarm device, so as to tension the springs.

Mounted in the casing 1 is a switch, which comprises a U-shaped switch member 22, the lateral ends 23 of the arms of which are journaled in bearings of the casing 1. This U-shaped switch member is arranged, so that its transverse portion 24 engages over the edges of the hammers, when they are set for firing the bombs. As shown in Figure 4 the usual sparking circuit 25 of an automobile is disclosed, and mounted upon one end of the casing 1 are contact terminals 26, which are insulated at 28 from the wall of the casing. These plates 26 are connected to the wall of the casing by means of the usual binding screws 29, to which the leads 30 of the sparking circuit 25 are connected. The terminal plates 26 have spaced ears 31, which are provided with registering depressions 32, to receive the projections 33 of the switch link 34, which is pivotally carried as at 35 on the transverse part of the switch member 22. When the hammers are set, and the switch link engaged between the terminal ears 31 of the plates 26, the circuit 25 is closed, and the engine of the automobile is capable of operating. However just as soon as one or more of the hammers are released, the switch member 22 will be actuated, by one or more of the hammers contacting therewith, moving it upon its pivot, thereby withdrawing the projections 33 of the switch link from the sockets or depressions of the terminal ears, hence breaking the sparking circuit, and rendering the engine of the automobile inoperative. As previously stated when one or more of the hammers are released, the bombs are exploded consecutively, thereby giving warning that an unauthorized person is in the act of taking the automobile. The warning will attract attention, hence an easy arrest of the thief will follow.

Mounted in bearings of the casing 1 is a transverse shaft 36, and mounted on the shaft is a plurality of coil bodies 37 of the vibrating triggers 38. The coil bodies 37 are spaced by means of the collars 39. The shorter arms 40 of the triggers have their ends notched as at 41, to engage the V-shaped edges of the notches 42 of the hammers 3, thereby holding the hammers set, as shown clearly in Figures 2 and 3.

The longer arms 43 of the triggers have their ends threaded at 44, and adjustable thereon are weights 45. The longer arms 43 of the triggers are designed to vibrate, due to the vibrations of the automobile, whether it is carried on a truck, or whether it is operating on its own wheels, and when the triggers are free to vibrate, the notched terminals of the arms 40 of said triggers will disengage from the hammers, and allow the hammers to actuate. It is obvious that by screwing the weights 45 toward the coil bodies of the triggers, substantial vibrations are necessary to cause the shorter arms to disengage the hammers. By adjusting the weights 45 from the coil bodies of the triggers, the vibrations of the triggers are greater, thereby more readily acting to release the hammers.

In using this improved theft preventing device, it is the aim to set the triggers, and while the owner of the automobile is operating the same, the triggers are unable to vibrate, hence preventing the release of the hammers unnecessarily. It is also the aim to provide means for preventing the vibration of the longer arms of the triggers, when the owner is operating the automobile. In order to hold the triggers set from vibrating, holding members 46, 47, 48 and 49 are provided. These members are in the form of discs, and are mounted on the key receiving sleeve 50, which is capable of rotation. Each holding member is in the form of a disc, and is provided with an arcuate surface or edge 51. When the discs or holding members are in position or set to prevent vibrations of the longer arms of the triggers, the arcuate surfaces or edges 51 are engaged by the longer arms of the triggers, hence preventing the triggers from vibrating, and also avoiding the triggers disengaging the hammers. The holding members or discs are rotatable in one direction only, and are provided with diametrically opposite notches 52 and 53. Secured to the bottom of the casing 1 are leaf spring dogs or catches 54, which are aligned with the discs or holding members. The free ends of the dogs or catches ride over the surfaces of the discs or holding members, so as to engage either set of notches 52 and 53. The discs or holding members are also provided with flat edges 55, which are opposite the arcuate edges 51. When the catches or dogs are engaged with the notches 53, the arcuate edges are disposed upwardly, so as to be immediately engaged by the longer arms 43 of the triggers, thereby preventing vibrations of said arms. However when any one or more of the discs are set so that only the respective dogs or catches 54 may engage the notches 52, the flat edges 55 are disposed upwardly. In view of the fact that the holding members or discs are cut away to provide the flat edges 55, there is nothing with which the arms 43 of the triggers may engage, hence the arms are free to vibrate, as a result of the vibrations of the automobile, whether being carried on a truck, or operating on its own wheels.

As previously stated the discs or holding members are mounted on the sleeve 50, and one end of the sleeve is provided with a flange 56. The rotating sleeve 50 is provided with diametrically opposite elongated slots 57. These slots extend entirely through one end of the sleeve, and partly through the flange 56, while they terminate short of the opposite end of the sleeve. Since the slots 57 of the sleeve merge only partly through the flange 56, the opposite portions of the sleeve are held relatively rigid. The holding members or discs 46 to 49 are provided with diametrically opposite notches 58. When the holding members or discs are set to prevent the vibrations of the longer arms of the triggers, in which case the arcuate edges 51 are engaged by the longer arms, the diametrically opposite notches 58 of the discs or holding members are in registration with the slots 57, therefore the holding dogs or spring catches 54 are engaged with the notches 53.

As shown in Figure 1 there is a plurality of keys 59, 60, 61 and 62, any one of which will enter the sleeve 50 for rotating and setting the holding members or discs. The key 59 is provided with a pair of lugs 63, which enter certain of the notches 58 and one of the slots 57, and when the key is inserted its full length the lugs 63 will engage the notches 58 of the discs or holding members 47 and 49, thereby permitting the discs 47 and 49 to be rotated, so as to dispose the flat edges or surfaces 55 of the holding members or discs 47 and 49 under the longer arms 43 of the triggers. In this case the longer arms 43 of the triggers immediately overlying the discs 47 and 49 will vibrate, thereby releasing certain of the hammers 3, which will fire their respective percussion caps 14. The key 60 is provided with a plurality of lugs 64, which will engage the notches 58 of all four holding members or discs, whereby the sleeve and the entire set of holding members or discs may be rotated for disposing their respective flat edges or surfaces under the arms 43 of the triggers, in which case all four hammers are released, and their respective percussion caps 14. The key 61 is provided with a pair of lugs 65, which engage the notches 58 of the discs or holding members 46 and 48, for rotating them and setting their flat edges or surfaces under the arms 43. In this case the triggers overlying the discs or holding members 46 and 48 will vibrate and release their respective hammers. The key 62 has a single lug 66, which engages one of the notches 58 of the holding member or disc 49, which will act to dispose its respective flat edge or surface under the arm 43 of the adjacent trigger, thereby releasing a single hammer. It is obvious that other keys may be used, and provided with lugs for turning the discs or holding members 47 and 48, or for turning the discs 46 or 49, or for turning the single disc 46, or either of the single discs 47 and 48. It is also obvious that other holding members or discs may be used, and in this case additional keys may be employed, so as to provide additional combinations. It will be noted that the catches or dogs 54 hold their respective discs or holding members aligned, and in order to hold the sleeve 50 in a position so that its diametrically opposite slots 57 may register with the notches 48, one end of the sleeve is provided with a transverse pin 67, the projecting end of which is designed to engage the diametrically opposite depressions 68 in one wall of the casing 1. In other words when the opposite ends of the pin 67 are engaged in its respective depressions 68, the longitudinal slots register with the notches 58, thereby holding the discs or holding members in position, either with their arcuate edges 51 immediately under the arms 43, or the flat edges under the arms 43. It is the aim that the owner of the car should remember which key was used when the device is set, so that certain arms 43 of the triggers may vibrate, especially when the owner returns to the automobile, and desires to relock the device, thereby avoiding the vibrations of the triggers, and hence cause the firing of the bombs unnecessarily.

As previously stated by providing a plurality of holding members or discs it is possible to use a great variety of keys, therefore no one can lock the device unless it is known what key was used in unlocking the same. The owner of the automobile can have two or more keys, and by using first one and then another, it makes the locking device so that it cannot be worked by any one who is not aware of the key which has been used for locking the device. By means of the adjustable weights on the vibrating arms, the alarm bombs can be fired easier at certain times than at other times, and it is the aim to adjust these weights according to the roads to be traversed. For instance on concrete roads or city pavements the weights are designed to be adjusted to their limit toward the free end of the arms 43, so that the arms 43 can vibrate much easier, than when traveling on rough dirt or other road beds. When traveling on rough road beds such as dirt or other surface the weights may be adjusted inwardly, so that the increased vibrations of the automobile may vibrate the arms 43 as easy as when the automobile may be traveling on concrete roads or city pavements.

When the owner leaves the automobile, the alarm device is set, by turning one or more of the discs or holding members, so that the flat edges are under the vibrating arms 43, by imparting a half turn to the sleeve 50. If it were not for the depressions 68 in one wall of the casing, the vibrations of the automobile would cause the sleeve 50 to gradually rotate, which would prevent the key from being inserted. Furthermore the pin 67 limits the insertion of the key, and being that the owner is aware that the key should be limited during its insertion in the sleeve, the key is inserted its full length until limited. By this arrangement, an unauthorized person, who is more or less careless would be very apt to turn the key before it is in its full length, and thereby rotate the wrong disc, in the attempt to set the device so as to prevent vibrations of the discs. In this attempt the unauthorized person may unlock another disc instead, therefore in this case the device will no doubt actuate and fire the bombs, and attract attention.

The casing of the device is designed to be fastened to the automobile by the angle plates 69, which are carried by the end of the casing. Furthermore the flanged end of the sleeve 50 axially aligns with an opening in the flanged sleeve 70, which is carried in the dash of the automobile, so that any one of the keys may be inserted.

When it is stated that the device is locked, it is meant that the device will not operate to give warning, and in this case the automobile may be moved by the owner or the proper person, and when the term unlocked is used, the automobile cannot be moved but a short distance, before the warning will be given. Secured to one side of the casing is a flat spring 71, which bears against the end of the sleeve 50, thereby holding the transverse pin 67 in the depressions 68. When rotating the sleeve 50 it is necessary to exert a certain amount of force on the key, so as to overcome the tension of the flat spring 71.

The hammers have a slot 72 to receive the hook of an implement (not shown), for setting the hammers in engagement with the lower arms of the triggers.

The casing is provided with a cover 73 which fits over the top of the casing, there being a suitable headed bolt 74 for holding the cover in position. The cover may be otherwise secured to the casing in any suitable manner (not shown), whereby no one but the owner of the automobile may remove the cover.

The invention having been set forth, what is claimed as being new and useful is:

1. In an automobile theft preventing device, the combination with a casing, of an alarm device, a plurality of hammers adapted to strike and sound the alarm device, a plurality of vibrating members for holding the hammers set, whereby upon the disengagement of any one of the vibrating members from its respective hammer, the alarm may be sounded.

2. In an automobile theft preventing device, the combination with a casing, of an alarm device, a plurality of hammers adapted to strike and sound the alarm device, a plurality of vibrating members for holding the hammers set, whereby upon the disengagement of any one of the vibrating members from its respective hammer, the alarm may be sounded, means adapted to be actuacted by any one of the hammers when released, for the purpose of stopping the automobile.

3. In an automobile theft preventing device, the combination with a casing, of an alarm device, a plurality of hammers adapted to strike and sound the alarm device, a plurality of vibrating members for holding the hammers set, whereby upon the disengagement of any one of the vibrating members from its respective hammer, the alarm may be sounded, adjustable devices on said vibrating members, for regulating the force of vibrations of said members.

4. In an automobile theft preventing device, the combination with a casing, of an alarm device, a plurality of hammers adapted to strike and sound the alarm device, a plurality of vibrating members for holding the hammers set, whereby upon the disengagement of any one of the vibrating members from its respective hammer, the alarm may be sounded, means adapted to be actuated by any one of the hammers when released, for the purpose of stopping the automobile, adjustable devices on said vibrating members, for regulating the force of vibrations of said members.

5. In an automobile theft preventing device, the combination with a casing, of an alarm device, a plurality of hammers adapted to strike and sound the alarm device, a plurality of vibrating members for holding the hammers set, whereby upon the disengagement of any one of the vibrating members from its respective hammer, the alarm may be sounded, and means adapted to be set to engage with and in the path of said vibrating members, to prevent the members from vibrating.

6. In an automobile theft preventing device, the combination with a casing, of an alarm device, a plurality of hammers adapted to strike and sound the alarm device, a plurality of vibrating members for holding the hammers set, whereby upon the disengagement of any one of the vibrating members from its respective hammer, the alarm may be sounded, and means adapted to be set to engage with and in the path of said vibrating members, to prevent the members from vibrating, said last mentioned means being movable so as to adjust portions of said means out of the path of the vibrating members, whereby they may vibrate.

7. In an automobile theft preventing device, the combination with a casing, of an alarm device, a plurality of hammers adapted to strike and sound the alarm device, a plurality of vibrating members for holding the hammers set, whereby upon the disengagement of any one of the vibrating members from its respective hammer, the alarm may be sounded, means adapted to be actuated by any one of the hammers when released, for the purpose of stopping the automobile, and means adapted to be set to engage with and in the path of said vibrating members, to prevent the members from vibrating.

8. In an automobile theft preventing device, the combination with a casing, of an alarm device, a plurality of hammers adapted to strike and sound the alarm device, a plurality of vibrating members for holding the hammers set, whereby upon the disengagement of any one of the vibrating members from its respective hammer, the alarm may be sounded, adjustable devices on said vibrating members, for regulating the force of vibrations of said members, and means adapted to be set to engage with and in the path of said vibrating members, to prevent the members from vibrating.

9. In a device for the purpose indicated, a casing, a plurality of alarm bombs including a series of percussion caps for exploding said bombs, a plurality of hammers, a plurality of vibrating members to hold the hammers set, whereby upon vibration of any one or more of said members, one or more of the hammers may release for firing one or more percussion caps, means for preventing the members from vibrating, said means comprising a plurality of rotatable discs having arcuate edges to engage and prevent the members from vibrating, said discs having flattened edges, means adapted to be rotated for rotating any one or a combination of said discs for exposing the flattened edges opposite one or a combination of said vibrating members, whereby said members are free to vibrate, to release one or a combination of hammers.

10. In a device for the purpose indicated, a casing, a plurality of alarm bombs including a series of percussion caps for exploding said bombs, a plurality of hammers, a plurality of vibrating members to hold the hammers set, whereby upon vibration of any one or more of said members, one or more of the hammers may release for firing one or more percussion caps, means for preventing the members from vibrating, said means comprising a plurality of rotatable discs having arcuate edges to engage and prevent the members from vibrating, said discs having flattened edges, and means adapted to be rotated for rotating any one or a combination of said discs for exposing the flattened edges opposite one or a combination of said vibrating members, whereby said members are free to vibrate, to release one or a combination of hammers, means adjustable on the vibrating members for regulating their vibrations with respect to the road bed over which the automobile travels.

In testimony whereof I hereunto affix my signature.

LOUIS F. WESCHE.